Jan. 2, 1951     E. SKYTTE     2,536,999
APPARATUS FOR ELECTRIC ARC-WELDING
Filed Nov. 21, 1946
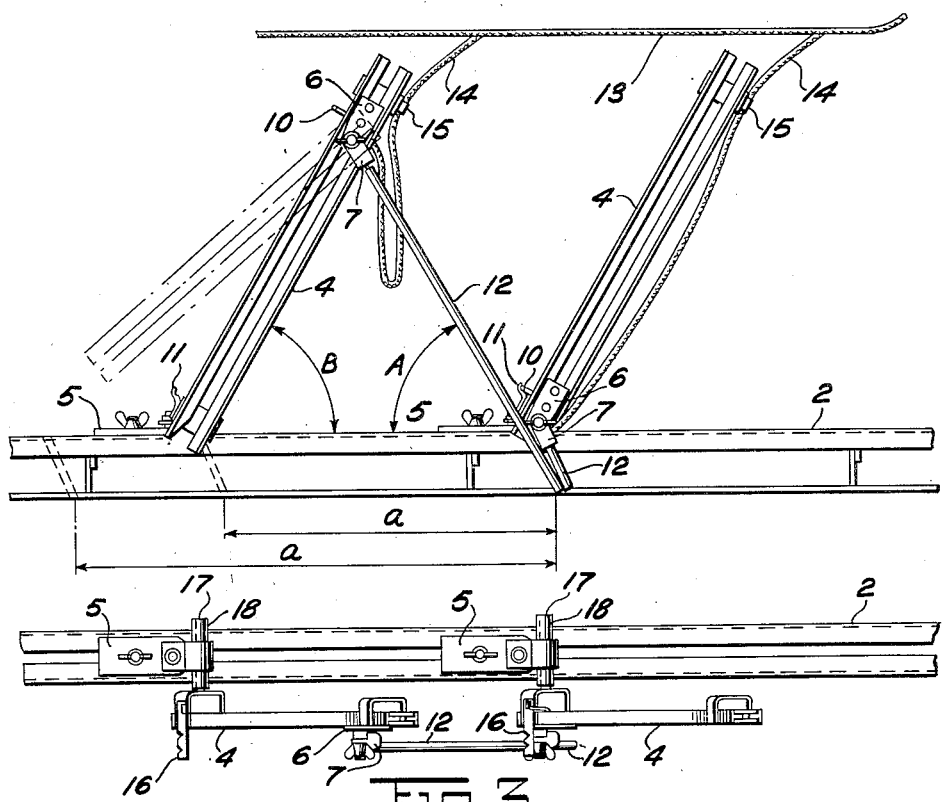
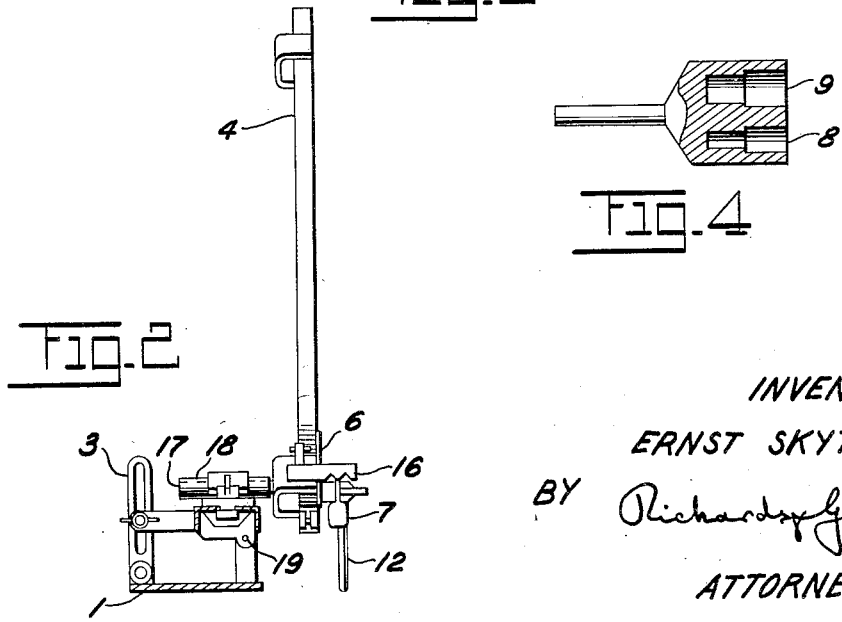
INVENTOR
ERNST SKYTTE
BY Richards Geier
ATTORNEYS Patented Jan. 2, 1951

2,536,999

UNITED STATES PATENT OFFICE 2,536,999

APPARATUS FOR ELECTRIC ARC-WELDING

Ernst Skytte, Copenhagen, Denmark, assignor to American Relay-Welder Company, Newark, N. J., a corporation of New Jersey Application November 21, 1946, Serial No. 711,385
In Denmark February 23, 1944

Section 1, Public Law 690, August 8, 1946
Patent expires February 23, 1964

8 Claims. (Cl. 219—8)

This invention relates to improvements in electric arc welding apparatus and more particularly to improvements in automatic electric arc welding apparatus.

Some of the disadvantages of automatic electric arc welding apparatus so far developed arise from the facts that the angle between the electrode and the work changes during the burning operation resulting in other than smooth and uniform welding; that the only possibility of varying the length of the weld of each electrode is by turning the electrode holder which varies the angle between the electrode and the work from the desired angle; that it has been impossible to switch at will from an electrode position in which the vertical projection of the electrode coincides with the weld to an electrode position in which the vertical projection of the electrode falls outside of the weld; and that even if the operator is relieved from the task of actually guiding the electrode during the burning period, the presence of the operator is required at each delivery of the arc.

It is an object of the present invention to provide an electric arc welding apparatus that combines the most desirable features of hand welding with those of automatic welding.

A further object is to automatically maintain a constant optimum angle between the electrode and work.

Another object is to automatically maintain a constant length of arc.

Still another object is to provide an electric arc welding apparatus in which the welding will be fully automatic throughout the length of the weld.

Other objects of the instant invention will become apparent in the course of the following detailed description.

In the accomplishment of these objectives, the automatic electric arc-welding apparatus consists of a foot plate which is clamped to the work. On the foot plate, substantially above and parallel to the axis thereof, is a rotatably mounted base rail. On the base rail are one or more guide rails releasably clamped at an angle thereto and longitudinally shiftable therealong. The number of guide rails required varies with the welding operation. Each guide rail is equipped with an electrode inserted in a holder longitudinally slidable along the guide rail supporting the electrode at an angle to the work with the lower end resting in the weld from which it is insulated by a covering. Electrical contact is established between the work and the core of the first electrode of the series forming an electric arc. The electrode acts as a support for the slide moving on the guide rail so that as the electrode is shortened by burning, the slide moves downwardly in the guide rail assisted by the vibrations set up in the electrode during the burning and maintaining the angle between the electrode and the work and the length of arc substantially constant during the entire operation. When the slide reaches the base of the guide rail, the arc of the burned down electrode is delivered to the following electrode by a turning movement imparted to the burned down electrode. The delivery of the arc from electrode to electrode takes place automatically throughout the series until the last electrode has been burned down and the weld completed. Thus the operator is released from the welding operation immediately after firing the first electrode in the series. Of course, by moving the foot plate with its appurtenances along the work the amount of space covered by each electrode may be varied, by rotating the base rail about the foot plate the electrodes are even capable of operation along a substantially upright seam, by varying the length of the electrode and/or angle of attachment to the guide rails the length of the weld is controlled, and, in the case of a weld on a cylindrical member, by rotating the cylindrical member under the electrode even other than straight line welding may be accomplished.

The invention will appear more clearly when taken in connection with the following drawings showing by way of example a preferred embodiment of the inventive idea.

Figure 1 is a side elevational view of the automatic welder constructed in accordance with the principles of this invention.

Figure 2 is an end view of the automatic welder shown in Figure 1.

Figure 3 is a top plan view of the automatic welder shown in Figure 1.

Figure 4 is a fragmentary sectional view of an electrode holder.

Referring now in greater detail to the drawings in which like reference numerals indicate like parts, reference numeral 1 indicates the foot plate, 2 the base rail, 4 the guide rails, 6 the movable slide, 7 the electrode holder, and 12 the electrode.

The foot plate 1 may be of any suitable material for supporting the subsequently described electrode 12 and adapted to be clamped to the work by any suitable means. The base rail 2 is disposed above the foot plate 1 as shown in Figures 1 and 2, pivotally supported along one edge by the pivotal mounting means 19 (Fig. 2) and adjustably supported along the opposite edge of the foot plate 1 by a slotted upright member 3. A wing nut co-acting with the slot and base rail permits rotation of the base rail 2 substantially as desired.

Along the top of the base rail 2 are one or more guide rails 4 longitudinally adjustable along the base rail 2 by the clamping device 5 which is designed to move longitudinally along the base rail 2 in the slot as shown in Figure 3 and to be clamped into position by a wing nut co-acting with a screw in contact with the bottom surface portion of the base rail 2 on either side of the slot.

Each guide rail 4 is provided with a longitudinal slideway as shown in Figure 1. In the slideway is the slide 6 which carries an electrode holder 7 adustably mounted on a horizontal axis. As shown in Figure 4, the electrode holder 7 has two bores 8 and 9 each of which has been drilled in two stages so that the holder is adapted to the use of electrodes having four different diameters. On the slide 6 is an angular arm 10 so mounted that when the slide approaches its lowest position in the guide rail 4, it will strike against a check 11 and co-acting with an enlarged tolerance between the slideway and the slide at the base on the side of the obtuse angle will turn on the axis of the angular part of the arm 10 moving the base of the slide and holder 6 in the direction of the obtuse angle. Obviously, the enlarged tolerance may be provided by removing the corner of the slideway on the side toward the obtuse angle if desired.

The electrode 12, inserted in the electrode holder 7, is connected through the cable 13 and branch cables 14 to one side of a welding transformer or welding current converter (not shown) while the opposite side of the current supply is connected through the work (also not shown). The branch cables 14 are held at the top to the guide rail 4 by means of any suitable strap 15. At the base of the guide rail 4 is an adjustable notch bar 16 adapted to adjust laterally the next electrode in relation to its predecessor in order to insure correct delivery of the arc. The guide rail 4 is pivotally mounted in the insulated bushing 18 by the pivot 17 so that it may turn in a plane which is at all times parallel to a plane through the weld.

The operation is as follows:

The foot plate 1 is provided with the number of guide rails 4 on the base rail 2 required for making the weld according to the desired length of weld per electrode. The adjustment of the length of the weld of each electrode is accomplished by turning the guide rail 4 on the pivot 17 while the adjustment of the electrode 12 for the desired angle in relation to the work is accomplished by turning the electrode holder 7 and clamping in the desired position. When the guide rails 4 have been correctly adjusted along the base rail 2 and all the electrode holders have been provided with electrodes, the foot plate 1 is clamped to the work in such a way that the lower ends of all the electrodes rest in the weld and are insulated therefrom by their covering. Moreover, the vertical projections of the electrodes when clamping the foot plate 1 to the work fall along contiguous segments of the line of weld. Electrical paths are then established to one side of the electrical source through the electrodes and to the opposite side of the electrical source through the work. The first electrode in the series is then manually fired starting the welding process. As the end of the first electrode 12 melts, the slide 6 begins to descend in the slideway of the guide rail 4 maintaining the electrode 12 at a constant angle to the plane of the work during the entire burning period. At the base of the slideway, the base of the slide 6, due to the increased tolerance between the inside edge of the slideway and slide or by removing the inside corner of the slideway itself, is forced toward the obtuse angle by contact of the arm 10 with the check 11. This movement of the slide 6 carries the end of the first electrode 12 toward the still unfired electrode 12 which transfers the arc from one to the other electrode and making the welding completely automatic throughout the length of the weld. The first burned down electrode 12 is only loosely held in the holder 7 and at the end of the burning period after transferring the arc to the following electrode 12 will fall out of the holder 6. It is to be noted that this transfer of the arc is further aided by the fact that the second electrode 12 is held in the holder 6 with substantial firmness while the burned electrode 12 because loosely held in the first holder 6 sets up a constantly increasing electrical resistance between the holder and the electrode. Similarly, the delivery of the arc will take place automatically from one electrode to the following until the last electrode has been burned down and the weld competed.

Of course, by forming the electrodes of such cross section that the aggregate material contained in them is adjusted in accordance with the entire length of the weld, the welding may be performed by placing the base rail in motion along the weld with the unburned electrodes forward in the direction of motion thereby extending the melting of each electrode over a larger part of the weld than is possible in case of a fixed base rail. Moreover, since the base rail 2 with guide rails 4 are turnable in a lateral direction, it is possible to use the apparatus at angles to the work and even for making welds on sloping or vertical surfaces. In the latter case, the necessary movement of the electrode holders and the electrodes toward the base rail may be accomplished by using springs or weights supported by flexible members over pulleys.

It is apparent that the specific example shown above has been given by way of illustration and not by way of limitation and that the structures above described are subject to wide variation and modification without departing from the scope or intent of the invention, all of which variations and modifications are to be included within the scope of the present invention.

Having now particularly described and ascertained the nature of my said invention and in what manner the same is to be performed, I declare that what I claim is:

1. An automatic electric arc welding apparatus comprising at least one foot plate, at least one base rail longitudinally disposed above the foot plate, at least two guide rails slidably adjustable along the base rail and adjustably inclined at an acute angle to the plane of the foot plate, each guide rail having a longitudinal slideway, a slide disposed in the slideway, an electrode holder disposed on the slide, means removably securing the foot plate to the work so that the bases of electrodes in said electrode holders will rest in the line of weld and the vertical projections thereof substantially contiguous along the line of weld, means connecting the electrodes to one side of an electrical current supply, means connecting the work to the opposite side of the electrical current supply, and means automatically shifting the first electrode substantially at the end of its burning period in the direction of the following electrode until the arc of the first electrode is delivered to said following electrode.

2. An automatic electric arc welding apparatus comprising at least one foot plate, at least one base rail longitudinally disposed above the foot plate, means adjustably rotating the base rail, at least two guide rails longitudinally adjustable along the base rail and inclined at an acute angle to the plane thereof, each of said guide rails having a longitudinal slideway, a slide in the slideways, an electrode holder disposed on the slides, an electrode removably disposed in the holders, each of said guide rails having its tolerance between the slideway and slide substantially increased at the base on the side toward the obtuse angle, means forcing the base of the slide toward the obtuse angle at the base of the slideway, means connecting the electrodes to one side of a current supply, means connecting the work to the opposite side of the current supply, and means removably securing the foot plate to the work with the bases of the electrodes in the line of weld and the vertical projections of the electrodes substantially contiguous along the line of weld.

3. An automatic electric arc welding apparatus according to claim 2 in which the electrode holder is characterized by being adapted to loosely hold the top of the electrode.

4. An automatic electric arc welding apparatus according to claim 2 in which the electrode holder is characterized by being adapted to loosely hold the top of electrodes of more than one diameter.

5. An automatic electric arc welding apparatus according to claim 2 in which the means forcing the base of the slide toward the obtuse angle at the base of the slideway comprises an arm disposed on the base of the slide on the side toward the obtuse angle, a co-acting arm disposed on the base of the guide rail and adapted to guide the base of the slide toward the obtuse angle.

6. An automatic electric arc welding apparatus comprising at least one foot plate, the foot plate comprising at least one substantially flat body surface portion and adapted to be removably mounted on the work; at least one base rail having a longitudinal slideway, means pivotally supporting one edge of the base rail above and substantially parallel to one edge of the foot plate, means adjustably securing the opposite edge of the base rail above the opposite edge of the foot plate; at least two guide rails slidably adjustable in the slideway of the base rail inclined upwardly from the base rail and inclined at an acute angle thereto and having a longitudinal slideway, at least one slide in the slideways, an electrode holder disposed on the slides and adjustable in a horizontal plane, the holder being characterized by being adapted for the insertion of electrodes of more than one diameter, a corner of the slideway of the guide rails being removed substantially at the base on the side of the obtuse angle, an arm disposed on the slide substantially at the base on the side of the obtuse angle, a coacting arm disposed on the guide rail substantially at the base forcing the base of the holder toward the obtuse angle; the apparatus further comprising means connecting the electrodes to one side of a current supply, means connecting the work to the opposite side of the current supply, and means removably securing the foot plate to the work with the bases of the electrodes in the line of weld and the vertical projections of the electrodes substantially contiguous along the line of weld.

7. An automatic electric arc welding apparatus according to claim 6, said apparatus further comprising means connected with said guide rails for alignment of said electrodes.

8. An electric arc welding apparatus comprising at least two upright supports having longitudinal slideways formed therein, a base for the supports, means attaching the upright supports to the base at an acute angle to the plane thereof, a check on each support substantially at the base and on the side of the obtuse angle, a longitudinal slideway in the supports, one side of the slideway flaring outwardly toward the base substantially in the vicinity of the following electrode, a slide in each slideway extending forwardly thereof and adapted to move downwardly therein under gravity, an arm on the slide coacting with the check and outwardly flaring portion of the slideway and adapted to impart a movement to the slide in the direction toward the following electrode.

ERNST SKYTTE.

REFERENCES CITED

The following references are of record in the file of this patent:

UNITED STATES PATENTS

| Number | Name | Date |
|---|---|---|
| 1,742,469 | Hand | Jan. 7, 1930 |
| 2,017,509 | Osborne | Oct. 15, 1935 |
| 2,166,638 | Muller | July 18, 1939 |
| 2,412,660 | Tyrner | Dec. 17, 1946 |

FOREIGN PATENTS

| Number | Country | Date |
|---|---|---|
| 112,353 | Great Britain | Apr. 4, 1918 |
| 358,608 | Great Britain | Oct. 15, 1931 |
| 550,727 | Great Britain | Jan. 21, 1943 |